Figure 1:
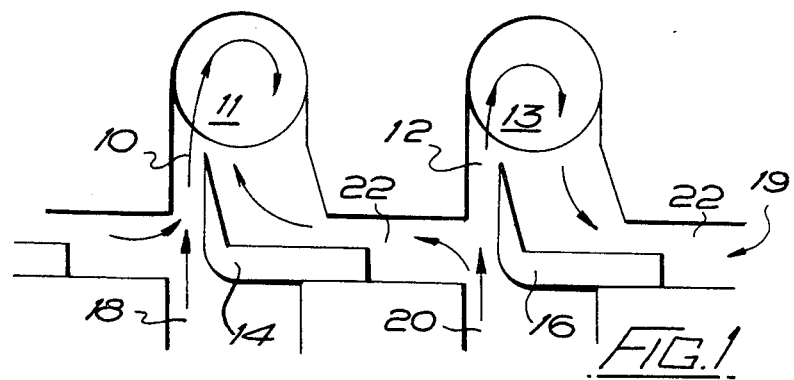

United States Patent [19]

Carr

[11] Patent Number: 4,465,035
[45] Date of Patent: Aug. 14, 1984

[54] INTERNAL COMBUSTION ENGINE
[75] Inventor: Roderick R. Carr, Sheffield, England
[73] Assignee: Bretton Patents Limited, Hathersage, England
[21] Appl. No.: 424,176
[22] Filed: Sep. 27, 1982
[30] Foreign Application Priority Data Sep. 29, 1981 [GB] United Kingdom ............... 8129359

[51] Int. Cl.³ ............................................. F02M 29/00
[52] U.S. Cl. ............................ 123/52 MB; 123/52 M; 123/188 M
[58] Field of Search ........... 123/188 M, 52 M, 52 MB
[56] References Cited

U.S. PATENT DOCUMENTS 4,180,041 12/1979 Miyazaki et al. ............... 123/188 M

FOREIGN PATENT DOCUMENTS 1026238 2/1953 France ........................... 123/52 MB
0060523 3/1947 Netherlands ................... 123/188 M Primary Examiner—Craig R. Feinberg
Assistant Examiner—David A. Okonsky
Attorney, Agent, or Firm—Larson & Taylor

[57] ABSTRACT

An internal combustion engine with an adjustable device for restricting air flow to the cylinders at low engine speed and for imparting vortex flow of air through the inlet valve ports to promote smooth running. In a multi-cylinder engine, a bleed flow of air will be able to take place between a closed inlet valve port and an open inlet valve port to maintain the vortex flow of air.

4 Claims, 9 Drawing Figures

INTERNAL COMBUSTION ENGINE

The invention relates to an internal combustion engine of high performance and relatively low fuel consumption.

Various designs of internal combustion engine have previously been devised with the object of increasing the available power output, for example, engines having large valves with high lift and with overlap of inlet and exhaust opening periods. Such designs have frequently resulted in high performance and possibly also relatively high efficiency within a certain range of engine speed but have generally been of poor performance with relatively low efficiency at low engine speed.

It is known that at relatively high engine speeds the atomised fuel is retained in suspension in the charge flowing to each cylinder, this being very largely due to the relatively high rate of flow of air through the inlet manifold and through the inlet ports to the engine. However, at relatively low engine speeds, and particularly during warm-up when the inlet manifold is still relatively cold, the atomised fuel in suspension in the air flowing into the combustion chambers tends to condense on the walls of the manifold and within the cylinders and/or to form relatively large droplets of fuel, the result being that incomplete combustion occurs. The result is rough and uneven running, low power output and high fuel consumption. The invention as claimed is intended to provide a remedy. It solves the problem of how to design internal combustion engine in which a high rate of flow of air within the inlet valve ports is maintained throughout the entire range of engine speed, thereby averting incomplete combustion at relatively low engine speeds.

The advantages offered by the invention are mainly that, since complete combustion takes place at relatively low engine speeds, rough and uneven running is avoided, power output is increased and fuel consumption is lowered. In addition, the engine concerned has what is termed lean mixture tolerance.

Figure 2:
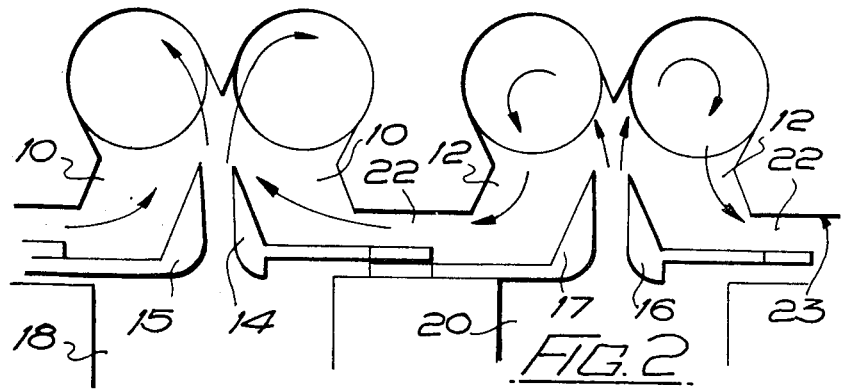
Figure 3:
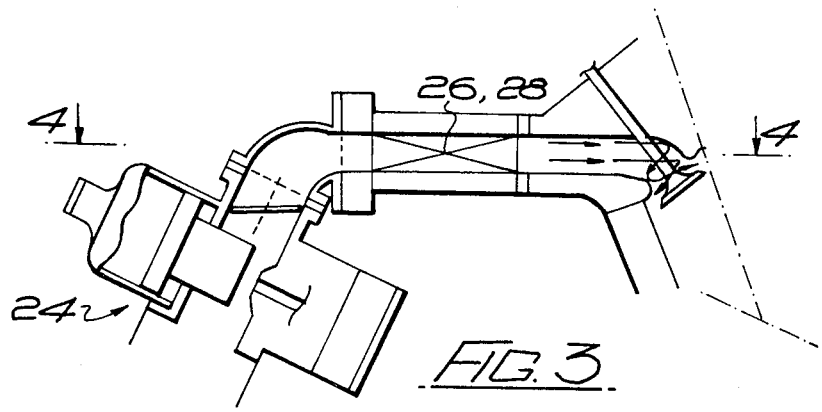
Figure 4:
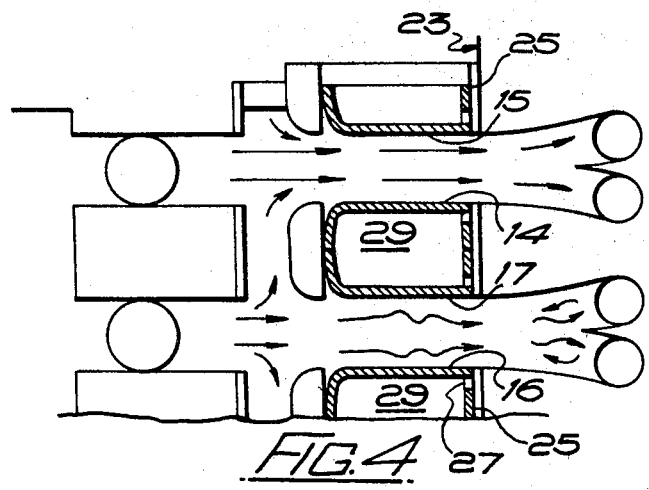
Figure 5:
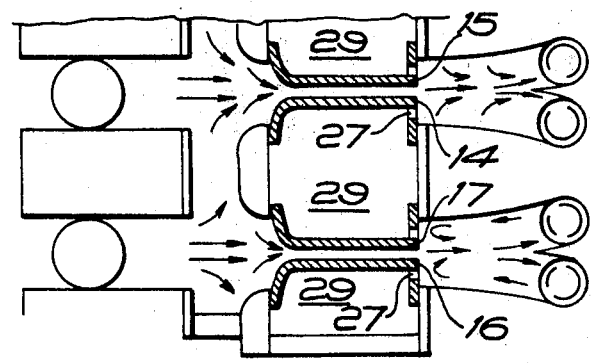
Figure 6:
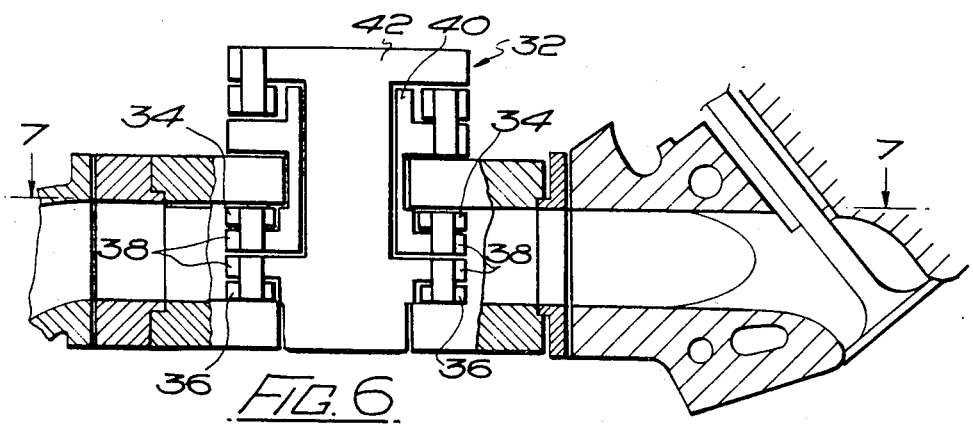
Figure 7:
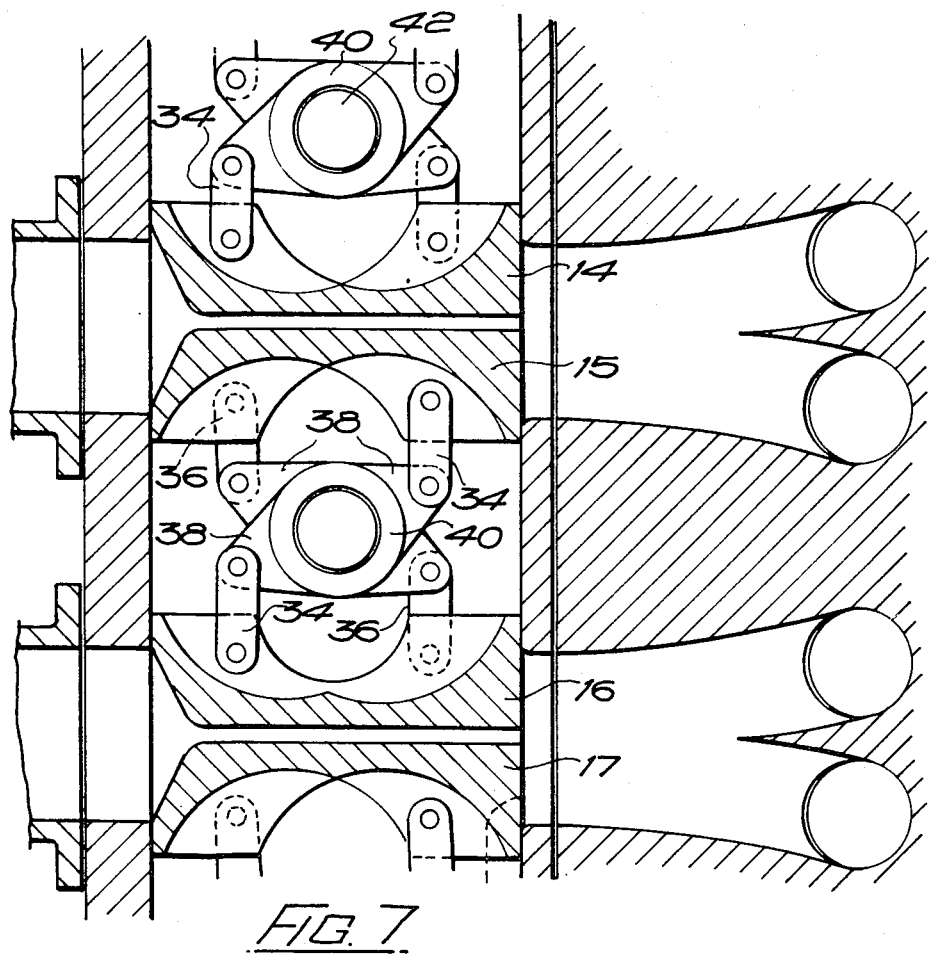
Figure 8:
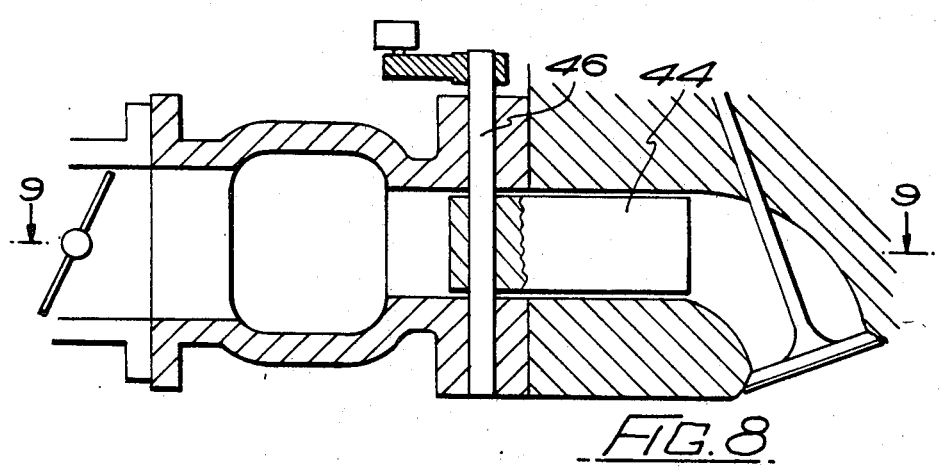
Figure 9:
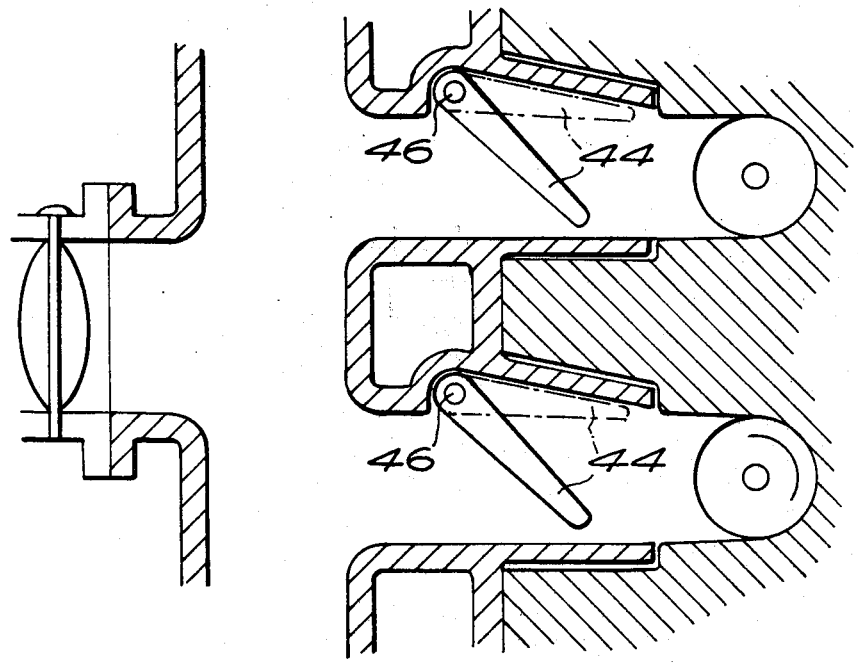

One way of carrying out the invention is described in detail below with reference to drawings which illustrate only one specific embodiment, in which:

FIG. 1 is a diagrammatic view of an arrangement embodying the invention,

FIG. 2 is a similar view of an arrangement similar to that of FIG. 1 but for an engine having two inlet valves per cylinder, FIG. 3 is a sectional view through a slide device constituting the invention and fitted adjacent a cylinder head inlet manifold, and FIG. 4 is a sectional view on the line 4—4 in FIG. 3, FIG. 5 is a view similar to FIG. 4 but showing the slide device in a different condition, FIG. 6 is a view similar to FIG. 3 but showing the slide device associated with a control linkage, FIG. 7 is a sectional view on the line 7—7 in FIG. 6, FIG. 8 is a sectional view through a vane type arrangement constituting the invention and again fitted adjacent a cylinder head inlet manifold, and FIG. 9 is a sectional view on the line 9—9 in FIG. 8.

Referring now to FIG. 1 of the drawings, the arrangement there illustrated is located adjacent an inlet manifold face from which inlet flow passages 10 and 12 to respective inlet ports 11 and 13 of the engine open, only an adjacent pair of the inlet flow passages being shown. In a plane at right angles to the direction of flow along the inlet flow passages there is located an adjustable slide arrangement generally indicated 19 and including respective port controllers 14 and 16 which are adapted to partially restrict air supply passages 18 and 20 leading to the flow passages 10 and 12. Means, not shown, are provided to move the port controllers simultaneously across the air flow passages, which are of rectangular cross section at that point, so that, when maximum restriction is being caused, the remaining narrow flow is along the side wall of each passage, said means being either engine speed responsive or also moving according to throttle actuation. The result of this is that as the air flow enters each air flow passage 10 and 12 the air passing to each inlet valve port is caused to flow as a vortically moving mass.

As shown by the arrows in FIG. 1, the arrangement is such that the inlet passages are connected by cross ports 22 so that when a particular inlet valve is closed, a bleed flow of air from its associated flow passage can pass to the flow passage of another valve which is open whereby the vortex flow of air within all the flow passages is maintained.

Referring now to FIG. 2, the arrangement there illustrated is located adjacent an inlet manifold face 23 of an engine having two inlet valves per cylinder. Consequently, in this case the adjustable slide arrangement includes respective port controllers 14, 15 and 16, 17 which are adjustable in opposite directions to partially restrict the pairs of air flow passages 10, 10 and 12, 12. The arrangement in this case is such that, when maximum restriction is being caused, the remaining narrow flow is through the gaps between the port controllers 14 and 15 and the port controllers 16 and 17 so that, as shown by the arrows, vortex flow of air is brought about in opposite directions in the flow passages to each pair of valves. As in the case of the first described embodiment, the inlet passages are connected by cross ports 22 so that when the inlet valves to one particular cylinder are closed a bleed flow of air from the associated flow passage can pass to the flow passage to another pair of valves which are open to that vortex flow tends to be maintained within the flow passages throughout the operation of the engine. Also as in the previously described embodiment means, not shown, are provided to move the port controllers simultaneously in response to engine speed or according to throttle depression or a combination of both.

In each case, as the adjustable slide arrangement operates to restrict the flow passages, an increasing proportion of the absolute gas velocity appears as whirl at the valve throats. For maximum throttle conditions the slide throat gap may be adjusted purely as a function of engine speed. Trial and experiment may show that this function should be linear with respect to engine speed up to a certain engine speed, for example up to the speed giving maximum torque.

It will be understood that FIGS. 1 and 2 are purely diagrammatic and that the arrangements there illustrated may be engineered in various ways. However, in FIGS. 3 to 5 there is illustrated a more detailed arrangement of parts for an engine basically similar to that of FIG. 2, this arrangement being associated with a redesigned S.U. type carburetor generally indicated 24. In this arrangement, the port controllers 14, 16 and 15, 17 are shown to be carried by respective slides 26, 28. The port controllers are shown to be capable of being retracted into respective cavities in the opposite side walls of the flow passage where this is of rectangular cross section before dividing to form the separate flow passages to the pair of inlet valves concerned. Consequently, at a relatively high engine speed the port controllers are completely retracted so that streamline flow can take place through the full cross sectional area of the flow passage as shown in FIG. 4. At relatively low engine speed the port controllers restrict the air flow passages as shown in FIG. 5 so that the charge flowing into each inlet valve port is caused to flow as a vortically moving mass as shown by the arrows. The port controllers, where they abut against a seal plate 25 clamped against the inlet manifold face 23 are provided with pressure balance ports 27, these giving access to spaces 29 between the pairs of port controllers.

Referring now to FIGS. 6 and 7, there is there illustrated a slide device similar to that just described with reference to FIGS. 3 to 5, associated with a control linkage generally indicated 32, the latter being constituted by respective pairs of links 34, 34 and 36, 36 which are pivotally connected to the port controllers 14, 15 and 16, 17 and to respective lugs 38 which are formed in oppositely pairs on concentrically located and contrarotatable swivel members 40 and 42. The arrangement is such that when the swivel members are turned with equal and opposite motion (by control mechanism not shown) the port controllers are displaced with equal and opposite motion towards or away from each other.

In the arrangement just described, provision is made for the interconnection of a balance pipe system by providing cutaways in the slide downstream face which act as variable throats. These cutaways permit a charge to pass into cavities behind the slides and then to other cylinders via an interconnecting pipe system.

FIGS. 8 and 9 illustrate a somewhat differently constructed device having the same object as the previously described arrangements but being of simpler form. In this case, the adjustable device referred to is constituted by an adjustable vane element 44 located in each air flow passage 10, 12, the vane elements being pivotally adjustable about the axis of respective pivot pins 46 located adjacent the side walls of the respective air flow passages. The arrangement is such that when maximum restriction is being caused, the vane elements extend almost completely across the air flow passages as shown in full lines in FIG. 9, the remaining narrow flow through each air flow passage being along the side wall of the passage opposite the pivot pin. As shown in chain-dotted lines in FIG. 9, the vane elements are capable of being retracted into respective cavities in the side walls of the air flow passages where these are of substantially rectangular cross section before merging smoothly with the respective inlet ports. Consequently, at a relatively high engine speed the vane elements are completely retracted so that streamline flow can take place through the full cross sectional area of the flow passages. Although now shown in the drawings, openings from the cavities in the side walls of the air flow passages communicate with a bypass system whereby, as in the previously described embodiment, during the period when a particular inlet valve is closed, a bleed flow of air from its associated flow passage can pass to the flow passage of another valve which is open so that at relatively low engine speeds the vortex flow of air within all the flow passages is maintained.

Thus there is provided an adjustable device for fitment to an internal combustion engine and by means of which it is thought that, at relatively low cost, performance and fuel economy will be improved, at least at low engine speeds, by the vortex flow of air through the flow passages. It is thought that this will result in smoother running and greater torque at low speeds with an improved tendency for the engine to be able to "pick-up" from low speed without the need for a change down to a lower gear ratio. The advantage will of course reduce as engine speed increases (because high rates of flow result from normal inspiration) until at a relatively high speed the port controllers will have become fully retracted and inoperative. The advantages of the invention will be particularly evident during warm up when it will be found that the atomised fuel in suspension in the flow of air through the inlet ports will remain in suspension far more readily than hitherto, and also that there will be increased swirl in the combustion chambers, by virtue of the vortex flow resulting in sonic or near sonic rates of flow at low throttle openings. It is also thought that the engine concerned will have what is termed lean mixture tolerance so that it will be capable of running smoothly on the minimum of fuel. Tests have shown that an engine embodying the invention has the characteristic of reducing any tendency to low speed knock in high compression engines.

An incidental advantage of the invention is the facility for effecting what is known as inertial port tuning. Inertial port tuning is normally used to achieve a charge pulse at the chosen conditions for increased cylinder volumetric efficiency. This type of tuning behaves very much as a "mass on a spring" oscillating system. The side effect is the lag of the inertial mass of the charge behind the spring of the cylinder volume. Consequently, early valve opening is required to accelerate the charge.

In conventional engine operation at low engine speed where the system is off-tune, a very low inertial lag (in terms of phase angle) is apparent, hence the charge will be entering the cylinder whilst the exhaust gas inertia is still providing efficient evacuation of the cylinder. Hence carryover of unburnt fuel. The variable area of the slide throat in this proposal allows the charge inertia and damping factor to be effectively increased at low engine speed.

This has two possible effects.

1. The inlet tract can be run close to tune at off-design rpm, causing a phase or inertial lag. 2. The increased damping coefficient caused by the reduced slide throat width will promote an increased phase lag.

If the slide throat can be fixed at an appropriate length to take advantage of the above, reduced low rpm carryover of unburnt mixture can be expected with increases in efficiency and reduction of atmospheric pollution. The effect can be enhanced by the appropriate tuning of the balance system which has a variable entry behind the slide or vane, as the case may be, and is thus of variable resonance in opposition to the port.

Various modifications or additions may be made. For example, a potentiometric linkage system may be used to allow the port controllers to interact with the engine throttle, thus removing the need for a conventional throttle. The invention can be applied to an engine will normal carburation or an engine fitted with fuel injection equipment, in which case the fuel is not carried through the adjustable slide or vane arrangement as the case may be.

The invention is also applicable to compression ignition (diesel) engines which are normally fitted with direct fuel injection to the cylinder. In this case the device would be used to provide more rapid movement of the charge air within the cylinder at the point of fuel injection, when combustion is initiated, at low engine speeds.

Many diesel engines are also used in stationary applications such as the powering of generator sets. These sets run at variable load and constant speed, the speed being often below optimum. In such circumstances the slide arrangement can be fitted in fixed form, as a single bolt-on component in order to re-match the engine, which will be a stock, variable duty engine, to a fixed speed duty required. In this case it is not necessary for the slide to operate in a rectangular port as there will be no movement. It is only necessary for the slide to fit the port. The slide may be in the form of separate inserts for each port.

What I claim and desire to secure by Letters Patent is:

1. An internal combustion engine having a plurality of cylinders, respective inlet valves through which air is caused to pass into said cylinders, a cylinder head, an inlet manifold having respective inlet valve ports leading to the cylinders, and an adjustable device, movable in response to changes of engine speed, whereby, at least at low engine speed, air passing through each inlet valve port is caused to flow as a vortically moving mass so that a high rate of flow of air within the inlet valve ports is maintained even at relatively low engine speeds and throughout periods when the respective inlet valves are closed, said adjustable device being constituted by a movable slide arrangement located adjacent a cylinder head inlet manifold face, the slide arrangement being adjustable in response to at least one of the following, that is to say engine speed and throttle depression, and being interconnected with a balance pipe system including cutaways in a downstream face of the slide arrangement which act as variable throats and permit charges to pass into cavities behind the slide arrangement and then to other cylinders via interconnecting pipes.

2. An internal combustion engine according to claim 1, in which inlet passages are interconnected in such a way that during the period when a particular inlet valve is closed, a bleed flow of air from its associated flow passage can pass to the flow passage of another valve which is open whereby the vortex flow of air within all the flow passages is maintained.

3. An internal combustion engine according to claim 1, in which the slide arrangement includes a slidably mounted port controller capable of being moved across each air flow passage so that, when maximum restriction is being caused, a narrow flow is formed along the side wall of each flow passage.

4. An internal combustion engine according to claim 1, having two inlet valves per cylinder, in which the adjustable device is constituted by a movable slide arrangement located adjacent the cylinder head inlet manifold face, the slide arrangement including a pair of port controllers for each pair of air flow passages being moved with respect to each other so that, when maximum restriction is being caused, a narrow flow is formed through the gap between each pair of port controllers.

* * * * *